United States Patent [19]

Takahashi et al.

[11] 3,896,272

[45] July 22, 1975

[54] MUTING SYSTEM IN MULTICHANNEL DISC REPRODUCING APPARATUS

[75] Inventors: Nobukai Takahashi, Yamato; Yoshiki Iwasaki, Yokohama; Masao Kasuga, Sagamihara; Yasuo Itoh, Tokyo, all of Japan

[73] Assignee: Victor Company of Japan, Ltd., Yokohama, Japan

[22] Filed: Oct. 3, 1973

[21] Appl. No.: 403,165

[30] Foreign Application Priority Data

Oct. 9, 1972 Japan .............................. 47-101262

[52] U.S. Cl. ............... 179/100.4 ST; 179/100.1 TD; 179/1 GQ; 179/15 BT

[51] Int. Cl. ........................... G11b 3/00; G11b 3/74

[58] Field of Search .......... 179/100.1 TD, 100.4 ST, 179/1 GQ, 15 BT, 100.1 TP; 329/122, 123, 124; 325/419, 421; 331/23, 25; 178/6.6 A

[56] References Cited

UNITED STATES PATENTS 3,346,815 10/1967 Haggi ................................ 325/419

3,573,382 4/1971 Feit ................................ 179/15 BT 3,686,471 8/1972 Takahashi ................. 179/100.4 ST

*Primary Examiner*—Bernard Konick

*Assistant Examiner*—David K. Moore

[57] ABSTRACT

A muting system in a multichannel record disc reproducing apparatus comprises a phase locked loop circuit having a phase comparator and a voltage controlled oscillator. A synchronous detector is supplied with an angular modulated wave which is reproduced from the disc and with an output signal of the voltage controlled oscillator. The detector produces a specific output signal when the phase locked loop circuit is locked to the input angular modulated wave and is carrying out normal demodulation operation. Muting is introduced to the output demodulated signal of the phase locked loop in response to the output of the synchronous detector means. The muting circuit permits passage of a demodulated signal only when the phase locked loop circuit is in a locked state.

8 Claims, 8 Drawing Figures

MUTING SYSTEM IN MULTICHANNEL DISC REPRODUCING APPARATUS

BACKGROUND OF THE INVENTION

The present invention relates to a muting system for use in a multichannel disc reproducing apparatus and more particularly to such a system for muting a demodulation system for an angular modulated wave, in an apparatus for reproducing a discrete multichannel disc which has previously recorded a multiplexed angular modulated wave and a direct wave.

In general, a disc of a discrete four-channel system has recorded thereon four-channel signals using a direct wave sum signal and an angular modulated wave difference signal multiplexed, as described in detail in U.S. Pat. No. 3,686,471.

An angular modulated wave is not contained in a conventional two-channel stereo disc. When this conventional disc is reproduced or played back by means of a reproducing apparatus capable of playing back the above mentioned discrete four-channel disc, it is necessary to cut off the demodulation system for the angular modulated wave and thereby prevent noises of this demodulation system from being sent to the succeeding stages. For this reason, a muting circuit is provided for cutting off the demodulation system for the angular modulated wave.

A type of known muting circuits comprises, a muting control circuit for detecting the presence or absence of an angular modulated carrier wave and for generating a corresponding detection output signal. A muting gate circuit is controlled by this detection output signal.

While this known type of muting control circuit is capable of positively detecting the presence of an angular modulated wave component, in a reproduced signal when the angular modulated wave component exists, it is incapable of positively detecting the complete absence of an angular modulated wave component in the reproduced signal when the angular modulated wave does not exist. For example, even when an angular modulated wave does not exist in the reproduced signal, the wave may be simulated by the harmonics of the audio frequency band which are generated at the time of tracing of the two-channel record. The known type of muting control circuit detects these harmonics. In this case, therefore, this known muting circuit carries out an erroneous operation, and noise is generated in the reproduced signal.

SUMMARY OF THE INVENTION

Accordingly, it is a general object of the present invention to provide a novel and useful muting system in a multichannel disc reproducing apparatus in which the above described difficulties have been overcome.

A specific object of the invention is to provide a muting system which does not operate erroneously responsive to the harmonics component of two-channel signals.

Another object of the invention is to provide a muting system in which a phase locked loop (PLL) circuit is used as a demodulation circuit for angular modulated waves, and a signal of the demodulation system is passed only when the PLL circuit is locked with respect to input signals.

Further objects and features of the invention will be apparent from the following detailed description when read in conjunction with the accompanying drawings.

DETAILED DESCRIPTION

Figure 1:
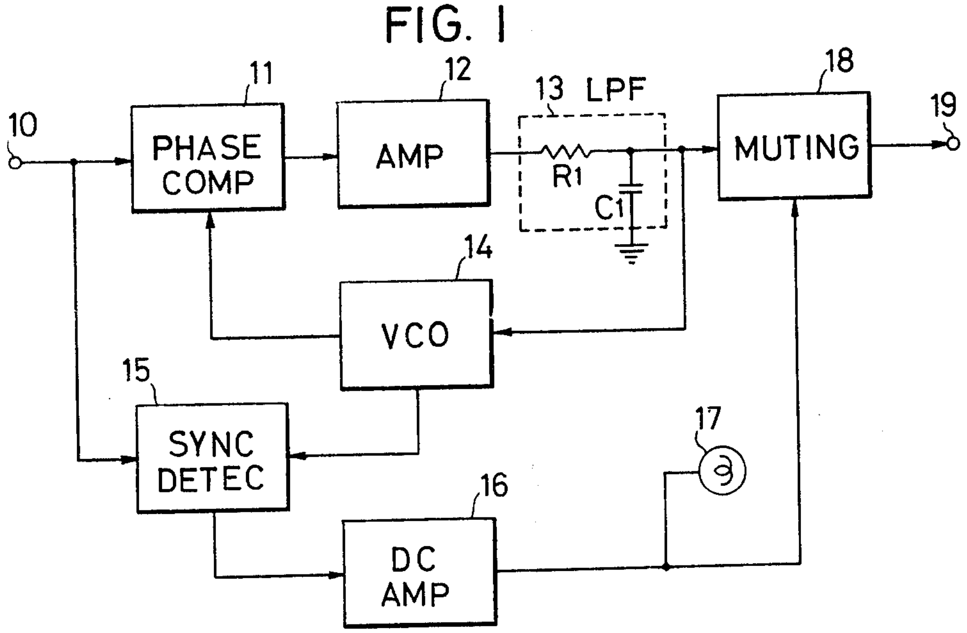
FIG. 1 is a block diagram showing an embodiment of the muting system in a multichannel disc reproducing apparatus, according to the invention.

Referring first to FIG. 1, an angular modulated wave difference signal (picked up by a pickup cartridge from a discrete four-channel disc and separated from a direct wave sum signal) enters the system through an input terminal 10 and is supplied to a phase comparator 11 and a synchronous detector 15.

The angular modulated wave signal is supplied to the phase comparator 11 and phase-compared with an output oscillation signal from a voltage controlled oscillator 14. The output signal of the phase comparator 11 is passed through an amplifier 12 and a low-pass filter 13 and then supplied, on the one hand, to a muting circuit 18, and on the other hand, to the voltage controlled oscillator 14.

The above mentioned phase comparator 11, amplifier 12, low-pass filter 13, and voltage controlled oscillator 14 constitute a phase-locked loop (PLL) circuit, which was known heretofore. The input angular modulated wave difference signal is demodulated by this PLL circuit. The demodulated difference signal component is supplied to the muting circuit 18.

The above mentioned PLL circuit has a predetermined lock range, with functions of the frequency deviation and level of the input angular modulated wave.

The term "lock range" is familiar to the engineers who design the phase locked loop circuit. For instance, a definition of this term is found in the catalogue of PHASE LOCKED LOOP LINEAR INTEGRATED CIRCUITS of Signetics Co., see page 3, the left column. Moreover, the diagram of LOCK RANGE AS A FUNCTION OF INPUT VOLTAGE is illustrated on page 2 of the catalogue.

When an angular modulated wave of a frequency deviation and level within this lock range is introduced as an input signal, the PLL circuit locks with this input and carries out normal demodulation operation. On one hand, if the reproducing apparatus is reproducing a two-channel stereo disc, there is no input angular modulated wave. If a four-channel disc is being played back, or if the angular modulated wave should be temporarily interrupted because of an occurrence such as abrasion damage or dust, the PLL circuit will be unlocked. At the time of this unlocking, the voltage controlled oscillator 14 is free-running at an oscillation frequency of 30 KHz to supplement the carrier wave component and prevent the generation of noise due to a non-existence of the carrier wave.

When the PLL circuit is locked to an input angular modulated wave, the phase angle between the input angular modulated wave and the oscillation output of the voltage controlled oscillator 14 is maintained at 90°.

On one hand, the above mentioned voltage controlled oscillator 14 gives the phase comparator 11 an output signal having a phase which differs by 90° from the phase of the signal supplied to the synchronous detector 15. At the same time, an input angular modulated wave signal from the input terminal 10 is being supplied to the synchronous detector 15, as described above.

It is well known that a synchronous detector is a circuit in the receiver which oscillates when the frequency and the phase of the signal are the same as those of the carrier signal of the modulated wave. This oscillation signal and the modulated wave are supplied to the gating circuit for gating (passing through) the modulated signal by this oscillation signal, and then produces the detected output from the gating circuit.

If the modulated wave is angle modulated, the amplitude thereof is held constant. As described in connection with the operation of FIG. 8, the voltage controlled oscillator generates two signals, differing by a phase of 90°. The output signal of the VCO has a 90° phase shift with respect to the carrier wave of the angle modulated wave and is supplied to the phase comparator for effecting demodulation. As a result of this operation, another output signal of the VCO is supplied to the synchronous detector. This signal may have either the same phase or the opposite phase, with respect to the carrier wave of the angle modulated wave. If the output signal of the VCO supplied to the synchronous detector and the carrier wave of the angle modulated wave have the same phase relationship, a positive voltage is generated at the output of the synchronous detector. However, if the PLL circuit is designed so that the two signals have opposite phase, 9 negative voltage is generated at the output of the synchronous detector.

As known heretofore, there are some kinds of muting circuits having a different circuit organization. If the PLL circuit is designed so that a positive voltage appears at the output of the synchronous detector when the phase locked loop circuit is locked to the angle modulated wave, the muting circuit may be employed which is changed over so as to pass the demodulated signal therethrough in response to this positive voltage. However, if the circuit is designed so that a negative voltage appears at the output of the synchronous detector when the PLL is locked, the muting circuit which may be changed over to pass the demodulated signal therethrough in response to the negative voltage will be adapted.

The synchronous detector 15 generates a positive or negative output depending, respectively, on whether the above mentioned two input signals are mutually of the same phase or whether they are of opposite phase when the input angular modulated wave signal exists. After being amplified by a DC amplifier 16, the output of the synchronous detector 15, is supplied to the above mentioned muting circuit 18, which is thereby made conductive. As a consequence, the demodulation difference signal from the low-pass filter 13 of the PLL circuit passes through the muting circuit 18 and is led out through an output terminal 19. Furthermore, a four-channel indication lamp 17 is lit by the output of the DC amplifier 16.

Accordingly, by locking with an angular modulated wave input at the input terminal 10, the PLL circuit normally demodulates the angular modulated difference signal. It is possible to detect this demodulation and to place the muting circuit 18 in the conductive state in order to derive the demodulated difference signal.

The synchronous detector 15 will be described next. When there is an input angular modulated wave, detector 15 generates an output which is either above or below a predetermined voltage value. In the instant embodiment, the synchronous detector 15 is adapted to provide the output below the predetermined value. At the same time, the DC amplifier 16 is adapted to generate an output only when a DC input is below a predetermined value.

The above mentioned two cases, which can be considered in the organization of the synchronous detector 15, will now be compared.

Figure 2:
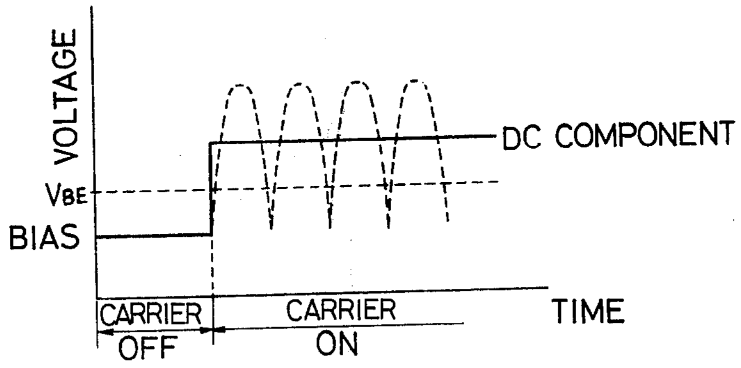
FIG. 2 is a voltage waveform chart which is useful for a description of the operation of an ordinary synchronous detector.

FIG. 2 indicates the operational state wherein the synchronous detector 15 produces a DC output voltage which is below a predetermined voltage $V_{BE}$, when an angular modulated wave input is not being applied and which produces a detection output of same polarity when an angular modulated wave input is applied. The DC component of this detection output becomes higher than the predetermined voltage $V_{BE}$. In FIG. 2, the predetermined voltage $V_{BE}$ is the threshold value between the base and emitter of the input-stage transistor of the DC amplifier 16. When this output is applied to a DC amplifier of the circuit in FIG. 4, the operation is as follows.

First, if there is no input angular modulated wave signal at the input terminal 10, the output of the synchronous detector 15, applied to a terminal 20, is less than the threshold voltage $V_{BE}$ between the base and emitter of transistor Q1, whereby the transistor Q1 is in the OFF state. Consequently, transistor Q2 is the ON state. Accordingly, the output through an output terminal 21 of the DC amplifier 16 is approximately zero volt, whereby the muting circuit 18 is in a cut-off state.

Then, if there is an input angular modulated wave signal at the input terminal 10, the DC component of the output of the synchronous detector 15 becomes higher than the predetermined threshold voltage $V_{BE}$, whereby the transistor Q1 switches ON. The transistor Q2 switches OFF, and the output voltage of the output terminal 21 becomes approximately + Vcc (12V). Therefore, the muting circuit 18 is rendered conductive by the output of the DC amplifier 16.

Thus, even when the synchronous detector 15 is adapted to generate an output in the above described manner, the muting circuit 18 can be rendered normally conductive when there is a normal angular modulated wave input at the terminal 10, and the PLL circuit is in the locked state.

Figure 3:
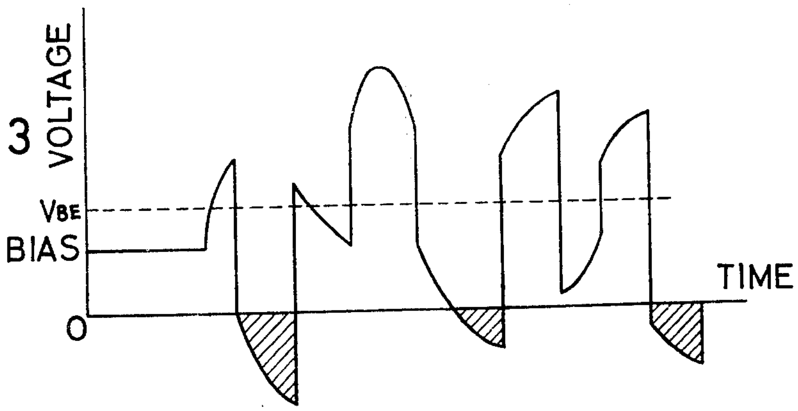
FIG. 3 is a chart of an output waveform of the synchronous detector for a random signal.

However, when a two-channel stereo disc is being played back, for example harmonics may be generated when a recorded signal having a large amplitude is reproduced. When these harmonics are applied to the input terminal 10, the PLL circuit is not locked since these harmonics are random waves. Accordingly, the synchronous detector 15 also produces a random signal as indicated in FIG. 3.

Since the DC component of this random wave is ordinarily zero, the DC level of the synchronous detector 15 would be expected to be below the predetermined voltage $V_{BE}$ as when there is no carrier. However, in actual practice, signals below a zero volt level (in the regions indicated by cross hatching) are not reproduced, and the apparent DC level rises. Therefore, when this DC level becomes higher than the predetermined voltage $V_{BE}$, the transistors Q1 and Q2 of the DC amplifier 16 respectively become ON and OFF, and an output voltage close to + Vcc is obtained at the terminal 21.

At this time, the muting circuit 18 is made conductive responsive to the output voltage of the DC amplifier. The erroneous solution occurs wherein a signal of the demodulation system is produced at the output terminal 19 despite the absence of an input angular modulated wave signal and the unlocked state of the PLL circuit. In this case, one measure is to preset the output bias of the synchronous detector 15 at a time when there is no input angular modulated wave with a large value and to prevent the random wave from becoming less than zero. However, it becomes necessary to keep this bias value below the threshold voltage $V_{BE}$ of the transistor for reasons arising from the coupling with the succeeding stage. It is difficult to satisfy the above conditions. Therefore, it is not desirable to adapt the synchronous detector 15 to operate in the above described manner.

In contrast, in the present embodiment, the synchronous detector 15 and the DC amplifier 16 are adapted to operate in the following manner.

Figures 4, 5, 6, 7:
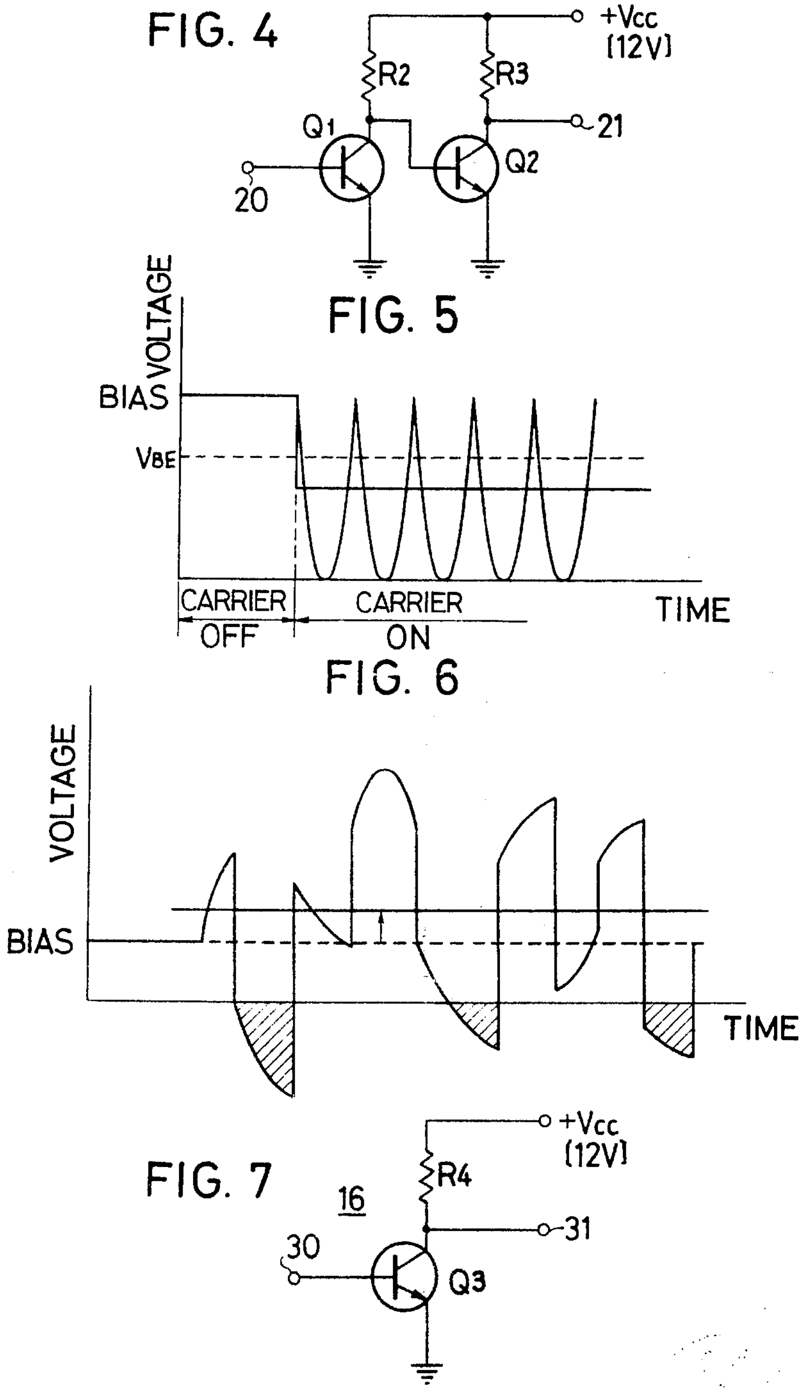
FIG. 4 is a circuit diagram of an ordinary DC amplifier.
FIG. 5 is a voltage waveform chart which is useful for a description of the operation of a synchronous detector suitable for use in the system of the invention.
FIG. 6 is a chart of an output waveform, of the synchronous detector in the system of the invention for a random signal.
FIG. 7 is a circuit diagram of a DC amplifier used in the system of the invention.

In the instant embodiment, the synchronous detector 15 is adapted to produce a DC bias voltage which is higher than the predetermined voltage $V_{BE}$ as indicated in FIG. 5 when there is no angular modulated input. Detector 15 is so adapted that the equivalent DC level of the output thereof becomes lower than the voltage $V_{BE}$, when there is an angular modulated wave input. One embodiment of a specific circuit for this synchronous detector is the circuit part within the enclosure 15, as defined by broken line in FIG. 8.

The DC amplifier 16 comprises a transistor Q3 as shown in FIG. 7. An input introduced through an input terminal 30 is inverted and taken out through an output terminal 31.

If the output of the synchronous detector 15, applied to the terminal 30, is greater than the threshold voltage $V_{BE}$ between the base and emitter of the transistor Q3, the transistor Q3 is in the conductive state and the potential of the output terminal 31 (or the potential of the collector of the transistor Q3) falls near the ground potential. The muting circuit 18 is such a circuit which is in a cut-off state under this condition.

Then, when there is an input angular modulated wave signal at the input terminal 10, the output DC level of the synchronous detector 15 falls below the threshold voltage $V_{BE}$, and the transistor Q3 is biased OFF. As a consequence, an output voltage of approximately + Vcc is obtained at the output terminal 31 of the DC amplifier 16, and the muting circuit 18 becomes conductive in this state.

Then, when a harmonics component enters through the input terminal 10 during reproduction of a two-channel stereo disc, the output of the synchronous detector 15 becomes random. The output DC level thereof rises as indicated by an arrow in FIG. 6. In the instant embodiment, however, an increase in the DC voltage due to this random output contributes to placing the transistor Q3 in the ON state. The output of the transistor Q3 becomes approximately zero similarly as when there is no angular modulated wave input.

Accordingly, even when a harmonics component arrives as input as described above, the DC amplifier 16 does not produce an output, and the muting circuit 18 holds its non-conductive state. Thus, there are no erroneous operations due to the existence of the harmonics component and the muting circuit 18 is not erroneously placed into its conductive state.

Figure 8:
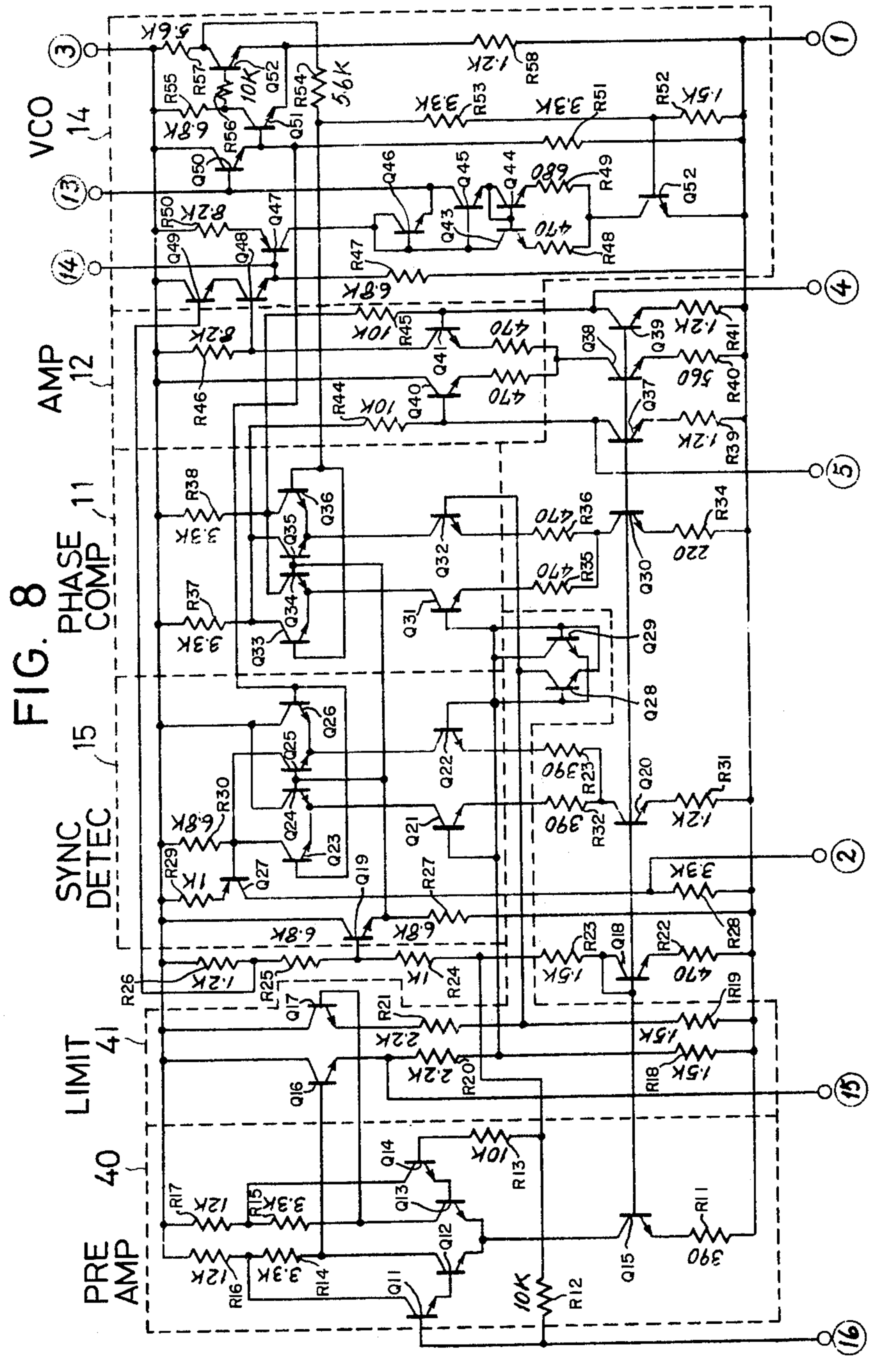
FIG. 8 is a circuit diagram of one embodiment of a specific circuit of the principal blocks in the block diagram illustrated in FIG. 1.

FIG. 8 shows one embodiment of a specific integrated circuit (IC) device resulting from the integration of a circuitry containing the above described phase comparator 11, amplifier 12, voltage controlled oscillator 14, and synchronous detector 15, a pre-amplifier 40 and limiter 41. The above mentioned pre-amplifier 40 and limiter 41 are circuits connected to the stage preceding the input terminal 10.

More particularly, FIG. 8 shows a circuit diagram for one embodiment of the invention. A DC voltage from a power supply (not shown) is applied to terminal③ The current is supplied from terminal③to a series circuit comprising resistors R26, R25, R24, R23, a transistor Q18, and a resistor R22. The bases of transistors Q15, Q18, Q20, Q30, Q37, Q38, and Q39 are connected with a common wire, having the base voltage of the transistors Q18 applied thereto. Accordingly, each of the transistors Q15, Q20, Q30, Q37, Q38, and Q39 receives the collector current determined by the emitter resistors R11, R31, R34, R39, R40, and R41, respectively.

Transistors Q11, Q12, Q13, and Q14 form a differential amplifier using a Darlington circuit. This amplifier amplifies the angular modulated wave applied to a terminal ⑯ and further causes the emitter follower amplifiers, respectively, including transistors Q16 and Q17 to operate.

The angle modulated wave is taken from the emitter of transistor Q16 and terminal ⑮. The control signals for automatically controlling the gain are formed from this angle modulated wave. However, because the automatic gain control is not directly related to the muting system of the present invention, the description thereof is eliminated.

The angle modulated wave obtained from the emitters of the transistors Q16 and Q17 flows through a series circuit comprising the resistors R20 and R18, and through another series circuit including the resistors R21 and R19. The resistors R20 and R18 divide a voltage signal which is applied to the base of the transistor Q29, and thereby amplified in an amplitude limiting manner. The resistors R21 and R19 divide a voltage signal which is applied to the base of the transistor Q28, and thereby amplified in the amplitude limiting maanner. These amplitude limited signals are respectively applied to the bases of the transistors Q21 and Q31 and to the bases of the transistors Q22 and Q32.

The circuit including the transistors Q23, Q24, Q21, Q25, Q26, and Q22 forms a conventional synchronous detector 15. The circuit including the transistors Q33, Q34, Q31, Q35, Q36, and Q32 constitutes a conventional phase comparator 11.

The collector of the transistor Q19 is connected to the power supply source (not shown). The emitter of transistor Q19 is grounded by way of the resistor R27. The base of transistor Q19 is connected to the junction point between the resistors R25 and R24, in the series circuit including the resistors R26, R25, R24, and R23, and the transistor Q18, and the resistor R22. The voltage appearing at the emitter of the transistor Q19 is applied as a reference voltage to the bases of the transistors Q24 and Q25 of the synchronous detector 15 and to the bases of the transistors Q34 and Q35 of the phase comparator 11.

To the bases of the transistors Q31 and Q32 of the phase comparator 11 there are applied the angle modulated waves which are amplitude limited and are opposite in phase. Moreover, to the bases of the transistors Q33 and Q36 and by way of the resistor R54 is applied the oscillation voltage from the voltage controlled oscillator 14. Therefore, at the collectors of the transistor Q33 and Q35 and of the transistors Q34 and Q36 are generated the phase error voltage corresponding to the difference between the phase of the angle modulated wave and the phase of the oscillation voltage, in the opposite relationship of their phase. These phase error voltages are applied by way of the resistors R44 and R45 of the amplifier 12 to the bases of the transistors Q40 and Q41. Then, the amplified output signal is obtained from the collector of the transistor Q41. The amplified output signal is applied to the base of the transistor Q48, and the output voltage is taken out of the emitter thereof through the terminal (14). The phase error voltage from the phase comparator 11 is the demodulated signal of the angle modulated signal which appears at the terminal (14).

Next, the operation of the voltage controlled oscillator 14 is described. In greater detail, a circuit including the transistors Q51 and Q52 constitutes a Schmitt type multivibrator. A timing capacitor (not shown) is connected between the terminal (13) and the earth terminal (1)

The phase error voltage amplified by the amplifier 12 is applied to the base of the transistor Q47. To the collector of the transistor Q47 is supplied a current having a value which depends on this phase error voltage. This current charges the timing capacitor by way of the transistor Q46 of a diode connection. The circuit including the transistors Q45, Q44 and Q43 constitutes a current mirror circuit.

In the Schmitt type multivibrator it is assumed that the transistor Q52 is in the conductive state, and that the transistor Q51 is in the cut off state. The current passing through the resistor 57 reduces the collector voltage of the transistor Q52. This reduced collector voltage is applied by way of the resistors R54 and R53 to the base of the transistor Q42, thereby switching it off. In this state, the timing capacitor is charged by the collector current of the transistor Q47, whereby the electric potential of the terminal (13) rises.

The electric potential of the terminal (13) is applied by way of the emitter follower transistor Q50 to the base of the transistor Q51. When the electric potential of the terminal (13) rises to the specific value which allows the transistor Q51 to become conductive, the transistor Q51 changes from the off state to the conductive state. At the same time, the transistor Q52 is converted from the conductive state to the off state.

In this state, the collector voltage of the transistor Q52 rises to the power supply source voltage. The electric potential of the base of the transistor Q42 also rises whereby the transistor Q42 becomes conductive. When the current flows between the collector and the emitter of the transistor Q42, the base potential of the transistor Q46 reaches a level which is lower than the emitter potential thereof, and thereby causes the transistor Q46 to switch off. In this state, the collector current of the transistor Q47 flows by way of the transistor Q43, resistor R48, and transistor Q42, to the earth terminal (1)

At the same time, the electric charge which has been charging the timing capacitor is discharged, as current flowing by way of the transistors Q45, Q44, resistor R49, and transistor Q42 to the earth terminal (1) The circuit including the transistors Q43, Q44, and Q45 constitutes the mirror circuit. At this time, the current flowing through the transistor Q43 and the current flowing through the transistors Q45 and Q44 are equal in their levels or values. Specifically, the collector current of the transistor Q47 and the discharging current of the timing capacitor is at an equal level.

The transistor Q52 is in the cut off state. The collector current of the transistor Q47 becomes the current for charging the timing capacitor. This means that the charging current is substantially equal to the discharging current.

As the electric charge of the timing capacitor discharges in this manner, the electric potential of the terminal (13) gradually decreases. When this potential decreases to the value which causes the transistor Q51 to switch off, the transistor Q52 is converted from the cut off state, to the conductive state. In this state, the timing capacitor is charged by the collector current of the transistor Q47. In this way, the charging and the discharging of the timing capacitor occur repeatedly.

The collector current of the transistor Q47 is the charging current. The discharging current of the timing capacitor corresponds to the phase error voltage from the phase comparator 11. The oscillation frequency of the Schmitt type multivibrator, including the transistors Q51 and Q52, is controlled by the phase error voltage and changes in a manner which coincides with the carrier frequency of the angle modulated wave, all of the time.

The charging current and the discharging current of the timing capacitor are substantially equal in their values. The electric potential of the terminal (13) changes with a triangular wave form. Furthermore, the conductive state of the transistors Q51, Q52 of the multivibrator is changed over at the vertex of each triangular wave. When the triangular waveform of the potential of the terminal (13) is going down, a square waveform rises at the collector of the transistor Q52. Hence, there is a 90° phase angle between the triangular wave at the terminal (13) and the square waveform at the collector of the transistor Q52.

The square waveform signal at the collector of the transistor Q52 is applied through the resistor R54 to the bases of the transistors Q33 and Q36 of the phase comparator 11. The triangular waveform at the emitter of the emitter follower transistor Q50 is applied to the bases of the transistors Q23 and Q26 of the synchronous detector 15.

When the phase locked loop is locked to the input angular modulated wave, the phase angle between the input angular modulated wave and the oscillation signal is maintained at 90 degrees at the collector of the transistor Q52 of the voltage controlled oscillator. Therefore, depending upon the triangular wave signal applied to the bases of the transistors Q23 and Q26 of the synchronous detector 15, the transistors Q23 and Q25 control or gate the input angular modulated wave which is in the opposite phase relationship to the triangular wave signal.

The DC voltage is applied from the power supply source through the resistor R30 to the collectors of the transistors Q23 and Q25. The direct current voltage is applied through the resistor R29 to the emitter of the transistor Q27. The collector thereof is grounded by way of the resistors R28. The base of the transistor Q27 is connected to the collectors of the transistors Q23 and Q25.

Accordingly, when the PLL is locked to the input angular modulated wave, the collector potentials of the transistors Q23 and Q25 are high. When it is not locked, the collector potentials thereof are lowered as compared with the aforementioned high value. Corresponding to this, the collector potential of the transistor Q27 is low when the phase locked loop is locked to the input angular modulated wave. When it is not locked, the collector potential becomes a value which is higher than the aforementioned value. The collector potential of the transistor Q27 is taken out through the terminal ② and is supplied to the DC amplifier 16.

In the input angular modulated difference signal to the PLL circuit, a noise signal component of a level comparable to or higher than the level of the carrier component or a noise component such as that of the harmonics component of the direct wave sum signal, the lock range characteristic of the PLL circuit will spread to very wide width, and the noise component will become readily demodulated.

Accordingly, the circuit is adapted so that the angular modulated wave difference signal is amplified by the pre-amplifier 40 to an extent which will not cause it to be saturated. The limiter 41 removes the above mentioned noise component and harmonics component of the direct wave. In this connection, this limiter 41 does not limit as deep as the limiter used in the first stage of an ordinary FM demodulation circuit. Instead, limiter 41 is set to limit in the order of from 6 to 7 dB, so as not to lose the lock range characteristic of the PLL circuit.

Referring again to FIG. 8, the output of the synchronous detector 15 is supplied from a terminal ② to the DC amplifier 16 outside of the IC device. The IC device is further provided with a terminal ① for grounding, a terminal ③ for the power supply voltage, a terminal ④ serving as an output terminal to a lock range control circuit (not shown) outside of the IC device, a terminal ⑤ for regulating the oscillation frequency of the voltage controlled oscillator 14, a terminal ⑬ for making a connection to a capacitor for the voltage controlled oscillator 14, a terminal ⑭ serving as a demodulation output terminal, a terminal ⑮ serving as the output terminal of the limiter 41, and a terminal ⑯ serving as the input terminal for the angular modulated wave to the pre-amplifier 40.

Further, this invention is not limited to these embodiments but various variations and modifications may be made without departing from the scope and spirit of the invention.

What is claimed is:

1. A muting system in a multichannel disc reproducing apparatus, said system comprising:

a phase locked loop circuit means including a phase comparator means operated responsive to the receipt of an angular modulated wave reproduced from a multichannel disc having recorded thereon a multiplexed signal including an angular modulated wave signal and a direct wave signal; a voltage controlled oscillator means operated responsive to an output signal from said phase comparator means to produce an output oscillation signal having an oscillation frequency controlled by said output signal, means for supplying said output oscillation signal to said phase comparator means, said phase locked loop circuit operating to demodulate said angular modulated wave;

synchronous detector means jointly responsive to said angular modulated wave and the output oscillation signal of said voltage controlled oscillator for producing a specific output when said phase locked loop circuit is locked to the input reproduced angular modulated wave during normal demodulation operation; and muting means operating in response to said said specific output of said synchronous detector means to carry out a gating operation and thereby introduce an output demodulated signal of said phase locked loop circuit to a succeeding stage.

2. A muting system in a multichannel disc reproducing apparatus as set forth in claim 1 and means whereby said voltage controlled oscillator means supplies to said synchronous detector means a signal differing in phase by 90° from said output signal supplied to said phase comparator.

3. A muting system in a multichannel disc reproducing apparatus as set forth in claim 1 which further comprises limiter means disposed in a stage preceding said phase comparator and means for operating said limiter means to remove the harmonics component of the direct wave signal included in the input angular modulated wave.

4. A muting system in a multichannel disc reproducing apparatus as set forth in claim 1 in which said synchronous detector means comprises means responsive to said input angular modulated wave and to said output oscillation signal for producing a DC output voltage which is lower than a predetermined voltage when said phase locked loop circuit is locked and higher than said predetermined voltage when said circuit is not locked, and a DC amplifier means responsive to the output of said synchronous detector for producing a muting control signal to operate said muting means.

5. A muting system in a multichannel disc reproducing apparatus as set forth in claim 4 in which said DC amplifier means produces a first output voltage responsive to the output of said synchronous detector when it is lower than said predetermined voltage and a second output voltage lower than said first output voltage when said output of the synchronous detector is higher than said predetermined voltage, and means whereby said muting means conductively passes the output of the phase locked loop circuit when the output of said DC amplifier is the first voltage and does not pass said output of the phase locked loop circuit when said output of the DC amplifier is the second voltage.

6. A muting system in a multichannel disc reproducing apparatus as set forth in claim 5 in which said DC amplifier means includes a single emitter-grounded transistor, means for making the transistor nonconductive and producing a first high collector voltage when a voltage lower than said predetermined voltage is applied on its base, and means for making the transistor conductive and producing a second collector voltage substantially equal to the ground potential when a voltage higher than said predetermined voltage is applied on its base, and means for making said synchronous detector produce an output voltage higher than and a voltage lower than a threshold voltage between the base and emitter of said transistor of the DC amplifier.

7. A muting system in a multichannel disc reproducing apparatus comprising:

a phase locked circuit means including voltage controlled oscillator means for generating a first signal having a frequency established responsive to a control signal, phase comparator means for comparing the first signal with an angular modulated wave reproduced from a multichannel record disc having recorded thereon multiplex signals comprising an angular modulated wave signal and a direct wave signal, said comparator means producing an output demodulation signal corresponding to the phase difference therebetween, and means for supplying a part of the output signal of said phase comparator means to said voltage controlled oscillator means as the control signal;

said voltage controlled oscillator means generating a second signal having the same frequency as the first signal and having a phase differing by 90 degrees from the phase of the first signal;

synchronous detector means responsive to the second signal and the angular modulated wave for producing a DC voltage which is lower than a predetermined voltage when said phase locked loop circuit is locked to the angular modulated wave and for producing a DC voltage which is higher than the predetermined voltage when said phase locked loop circuit is not locked to the angular modulated wave; and muting means responsive to the DC voltage which is lower than the predetermined voltage for passing the output signal of said phase comparator means and responsive to the DC voltage which is higher than the predetermined voltage for interrupting the output signal of said phase comparator means.

8. The muting system of claim 7 further comprising DC amplifier means responsive to the DC voltage which is lower than the predetermined voltage for producing a first voltage and responsive to the DC voltage which is higher than the predetermined voltage for producing a second voltage which is lower than the first voltage, said muting means passing the output signal of said phase comparator means in response to the first voltage and interrupting the output signal of said phase comparator means in response to the second voltage.

* * * * *